T. HUDSON.
WASTE-PIPE TRAP.
No. 170,268. Patented Nov. 23, 1875.
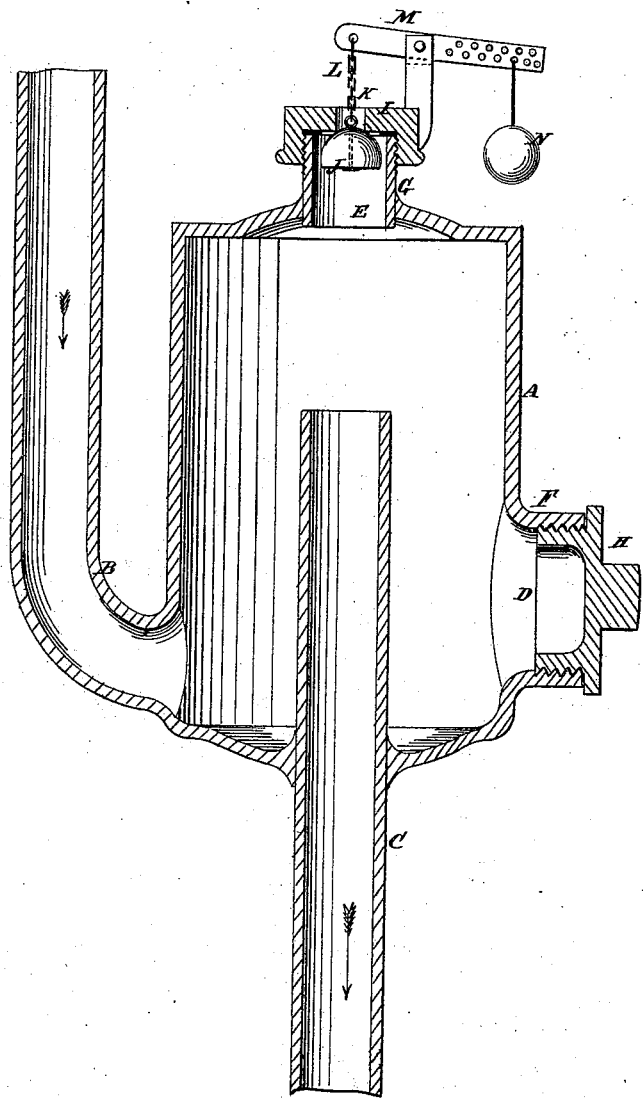

UNITED STATES PATENT OFFICE.

THOMAS HUDSON, OF BROOKLYN, NEW YORK.

IMPROVEMENT IN WASTE-PIPE TRAPS.

Specification forming part of Letters Patent No. 170,268, dated November 23, 1875; application filed February 7, 1874.

*To all whom it may concern:*

Be it known that I, THOMAS HUDSON, of Brooklyn, in the county of Kings and State of New York, have invented a new and Improved Waste-Pipe Trap, of which the following is a specification:

The invention relates to an improved valve attachment for stench-traps, the object of which is chiefly to allow instant admission of air to supply the smallest vacuum created by the tendency of traps to siphonic action, and to prevent the gurgling sound frequently produced in the common stench-trap.

The invention is more particularly an improvement upon a patented trap in which a water-sealed valve is employed, and which is to a certain extent defective or inoperative, owing to the peculiar construction and arrangement of said valve.

I will proceed to describe my improvement, reference being had to the accompanying drawing, illustrating in vertical section a trap provided with an inner stand-pipe, of the usual construction, for preventing the contents being entirely siphoned off.

A is the trap case, which I propose to cast in one piece together with the inlet-pipe B and outlet-pipe C, making the opening D for clearing out the trap, and openings E for the vent, each opening having its appropriate connection F G, for screwing on the closing-caps H I; but any other form or arrangement may be employed, provided it have sufficient height between the top of the waste-pipe C and the bottom of the trap for a column of water sufficient to resist a suction strong enough to pull the valve down. The pipe C projects vertically into the interior of the trap A about half the length of the latter, so that it will remain constantly half filled with water. J is the valve for closing the vent-hole K, which is made in the cap I. It is made preferably of a ball of rubber, and is suspended by a chain, L, from a lever, M, on the top of the trap, having a weight, N, for closing it. This weight is not quite so effective upon the valve as the weight of a column of water in the trap of equal area to the vent, so that the weight will rise and let the valve open before the water will be sucked out. The weight is adjustable along the lever for exerting more or less force, as circumstances may require.

My invention is applicable to any and all kinds of traps used for liquids, and may be put in traps now in use.

Having thus described my invention, I claim as new and desire to secure by Letters Patent—

The combination, with a stench-trap, A, provided with top vent-hole K, of the conical suspended valve J, and the pivoted lever M and adjustable weight N, all constructed and arranged as shown and described, to operate as specified.

THOMAS HUDSON.

Witnesses:
T. B. MOSHER,
ALEX. F. ROBERTS.